(12) United States Patent
Holzer et al.

(10) Patent No.: US 10,437,879 B2
(45) Date of Patent: Oct. 8, 2019

(54) VISUAL SEARCH USING MULTI-VIEW INTERACTIVE DIGITAL MEDIA REPRESENTATIONS

(71) Applicant: Fyusion, Inc., San Francisco, CA (US)

(72) Inventors: Stefan Johannes Josef Holzer, San Mateo, CA (US); Abhishek Kar, Berkeley, CA (US); Alexander Jay Bruen Trevor, San Francisco, CA (US); Pantelis Kalogiros, San Francisco, CA (US); Ioannis Spanos, Larisa (GR); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 268 days.

(21) Appl. No.: 15/409,500

(22) Filed: Jan. 18, 2017

(65) Prior Publication Data
US 2018/0203877 A1    Jul. 19, 2018

(51) Int. Cl.
*G06F 16/583*    (2019.01)
*G06K 9/00*    (2006.01)
*G06K 9/22*    (2006.01)

(52) U.S. Cl.
CPC ..... *G06F 16/5838* (2019.01); *G06K 9/00201* (2013.01); *G06K 9/00671* (2013.01); *G06K 9/22* (2013.01)

(58) Field of Classification Search
CPC ............ G06F 16/5838; G06K 9/00201; G06K 9/00671; G06K 9/22
USPC ........................................................ 707/769
See application file for complete search history.

(56) References Cited

U.S. PATENT DOCUMENTS

| | | |
|---|---|---|
| 5,926,190 A | 7/1999 | Turkowski et al. |
| 6,252,974 B1 | 6/2001 | Martens et al. |
| 8,078,004 B2 | 12/2011 | Kang et al. |
| 2002/0094125 A1 | 7/2002 | Guo |
| 2006/0188147 A1 | 8/2006 | Rai et al. |
| 2008/0106593 A1 | 5/2008 | Arfvidsson et al. |
| 2008/0152258 A1 | 6/2008 | Tulkki |
| 2008/0201734 A1 | 8/2008 | Lyon et al. |
| 2008/0225132 A1 | 9/2008 | Inaguma |
| 2008/0246759 A1 | 10/2008 | Summers |
| 2009/0263045 A1 | 10/2009 | Szeliski et al. |
| 2009/0303343 A1 | 12/2009 | Drimbarean et al. |
| 2010/0033553 A1 | 2/2010 | Levy |
| 2010/0171691 A1 | 7/2010 | Cook et al. |
| 2011/0254835 A1 | 10/2011 | Segal |

(Continued)

*Primary Examiner* — Albert M Phillips, III
(74) *Attorney, Agent, or Firm* — Kwan & Olynick LLP

(57) ABSTRACT

Provided are mechanisms and processes for performing visual search using multi-view digital media representations, such as surround views. In one example, a process includes receiving a visual search query that includes a surround view of an object to be searched, where the surround view includes spatial information, scale information, and different viewpoint images of the object. The surround view is compared to stored surround views by comparing spatial information and scale information of the surround view to spatial information and scale information of the stored surround views. A correspondence measure is then generated indicating the degree of similarity between the surround view and a possible match. At least one search result is then transmitted with a corresponding image in response to the visual search query.

20 Claims, 12 Drawing Sheets

(56) References Cited

U.S. PATENT DOCUMENTS

| | | |
|---|---|---|
| 2011/0261050 A1 | 10/2011 | Smolic et al. |
| 2012/0019557 A1 | 1/2012 | Aronsson et al. |
| 2012/0147224 A1 | 6/2012 | Takayama |
| 2013/0155180 A1 | 6/2013 | Wantland et al. |
| 2013/0162634 A1 | 6/2013 | Baik |
| 2013/0250045 A1 | 9/2013 | Ki et al. |
| 2014/0087877 A1 | 3/2014 | Krishnan |
| 2014/0253436 A1 | 9/2014 | Petersen |
| 2014/0307045 A1 | 10/2014 | Richardt et al. |
| 2015/0046875 A1* | 2/2015 | Xu .................... G06F 17/30274 715/834 |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0339846 A1 | 11/2015 | Holzer et al. |
| 2016/0042251 A1* | 2/2016 | Cordova-Diba .......... G06T 5/00 382/180 |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0084001 A1 | 3/2017 | Holzer et al. |

\* cited by examiner

VISUAL SEARCH USING MULTI-VIEW INTERACTIVE DIGITAL MEDIA REPRESENTATIONS

TECHNICAL FIELD

The present disclosure relates to visual search in which a multi-view interactive digital media representation, such as a surround view, is used in a search query.

DESCRIPTION OF RELATED ART

Online searches are commonly used when someone wants to find information about a subject or object of interest. In particular, a user typically submits a textual search query to a search engine on the internet. For instance, a word, phrase, or question can be used to find information about an object by name. Search results can include descriptions, pictures, videos, etc.

However, when someone is searching for a particular object, such as a pair of shoes or a toy, the user must know what search terms to enter. If the user has the object in hand but does not know what the item is called, the user may have difficulty searching for the object. For instance, the user may want to identify the object and information about it, such as with a vintage toy or pair of shoes. The user may also want to search for the item's availability, especially if the user wants to purchase the item again or if the user wants to research the value of the item for resale.

Another type of online searching includes visual search using a single image as a search query. However, such visual search capabilities are limited by the information visible in that single image. Because a single image provides limited information about an object, using a single image as a search query often fails to yield accurate results.

Accordingly, it is desirable to develop improved mechanisms and processes relating to searching for objects. Such improved mechanisms and processes can facilitate search in an efficient manner without requiring the user to know anything about the object. More specifically, improved mechanisms that allow users to search using visual data are desirable.

OVERVIEW

Provided are various mechanisms and processes relating to performing visual search using multi-view digital media representations, such as surround views.

In one aspect, which may include at least a portion of the subject matter of any of the preceding and/or following examples and aspects, a process includes receiving a visual search query that includes a surround view of an object to be searched, where the surround view includes spatial information, scale information, and different viewpoint images of the object. The surround view is compared to stored surround views by comparing spatial information and scale information of the surround view to spatial information and scale information of the stored surround views. A correspondence measure is then generated indicating the degree of similarity between the surround view and a possible match. At least one search result is then transmitted with a corresponding image in response to the visual search query.

In another aspect, which may include at least a portion of the subject matter of any of the preceding and/or following examples and aspects, a system includes an interface, search server, and front end server. The interface is designed to receive a visual search query that includes a surround view of an object to be searched, where the surround view includes spatial information, scale information, and different viewpoint images of the object. The interface is further designed to transmit an image associated with a search result in response to the visual search query. The search server is designed to compare the surround view to stored surround views by comparing spatial information and scale information of the surround view to spatial information and scale information of the stored surround views. The front end server is designed to generate a correspondence measure indicating the degree of similarity between the surround view and a possible match obtained from the stored surround views.

In yet another aspect, which may include at least a portion of the subject matter of any of the preceding and/or following examples and aspects, a computer readable medium includes computer code for receiving a visual search query that includes a surround view of an object to be searched, where the surround view includes spatial information, scale information, and different viewpoint images of the object. The computer readable medium also includes computer code for comparing the surround view to stored surround views by comparing spatial information and scale information of the surround view to spatial information and scale information of the stored surround views. The computer readable medium also includes computer code for generating a correspondence measure indicating the degree of similarity between the surround view and a possible match obtained from the stored surround views. Additionally, the computer readable medium includes computer code for transmitting an image associated with a search result in response to the visual search query.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
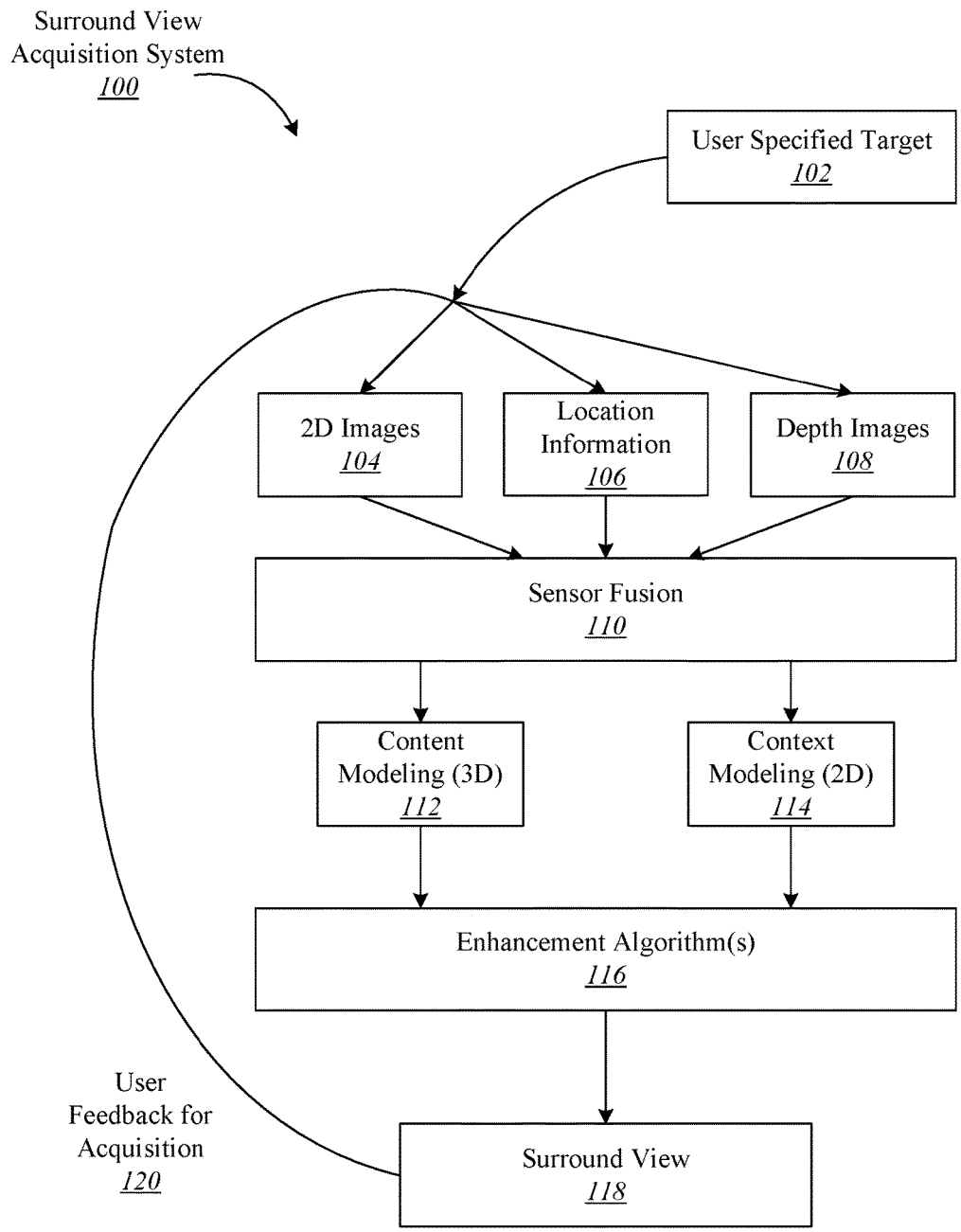
FIG. 1 illustrates an example of a surround view acquisition system.

Reference will now be made in detail to some specific examples of the present disclosure including the best modes contemplated by the inventors for carrying out various embodiments of the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to various embodiments, improved mechanisms and processes are described for facilitating visual search using a multi-view digital representation such as a surround view. Such improved mechanisms and processes allow a user to search for an object in an efficient manner by using a surround view or other multi-view digital media representation as a search query. The search query is then used to find search results for visual matches. In some examples, these visual matches are found by comparing a surround view of the object to stored surround views of objects. In particular embodiments, a surround view of an object to be searched is compared to stored surround views by basing the comparisons on spatial information, scale information, and a multiple images from different viewpoints that are associated with the respective surround views. In other examples, visual matches are found by comparing a surround view of the object to stored images of objects.

The mechanisms and processes described in this disclosure provide improvements over previous visual searching capabilities that use a single image as a search query. Although visual search using a single image as a search query enables a user to look for information about items similar to an object depicted, such searching capabilities are limited by the information visible in that single image. Because a single image provides limited information about an object, using a single image as a search query often fails to yield accurate results. By using a multi-view digital media representation, such as a surround view, in a search query, as described in various embodiments herein, significantly more information is available that can yield significantly better and more relevant search results. Although particular examples described herein describe using surround views for visual search, it should be noted that any multi-view digital media representation can be used for visual search as described herein.

With reference to FIG. 1, shown is an example of a surround view acquisition system that can be used to generate a multi-view interactive digital media representation, such as a surround view, that can be used in a visual search query. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 100 is depicted in a flow sequence that can be used to generate a surround view. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure- detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in visual search.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

Figure 2:
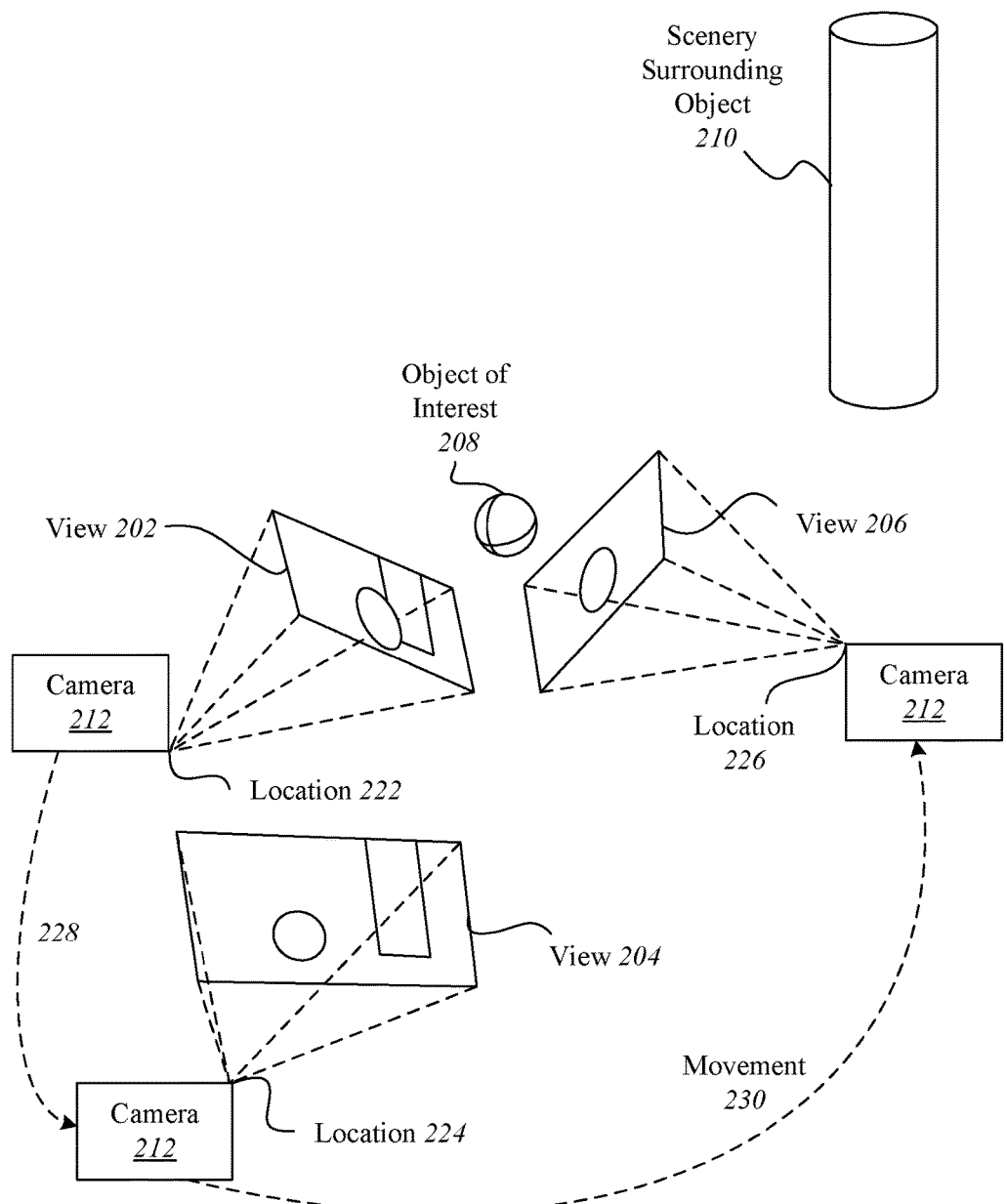
FIG. 2 illustrates an example of a device capturing multiple views of an object of interest from different locations for a surround view.

With reference to FIG. 2, shown is an example of a device capturing multiple views of an object of interest from different locations for a surround view. The capture device is indicated as camera 212, and moves from location 222 to location 224 and from location 224 to location 226. The multiple camera views 202, 204, and 206 captured by camera 211 can be fused together into a three-dimensional (3D) model. According to various embodiments, multiple images can be captured from various viewpoints and fused together to provide a multi-view digital media representation, such as a surround view.

In the present example embodiment, camera 212 moves to locations 222, 224, and 226, respectively, along paths 228 and 230, in proximity to an object of interest 208. Scenery can surround the object of interest 208 such as object 210. Views 202, 204, and 206 are captured by camera 212 from locations 222, 224, and 226 and include overlapping subject matter. Specifically, each view 202, 204, and 206 includes the object of interest 208 and varying degrees of visibility of the scenery surrounding the object 210. For instance, view 202 includes a view of the object of interest 208 in front of the cylinder that is part of the scenery surrounding the object 208. View 204 shows the object of interest 208 to one side of the cylinder, and view 206 shows the object of interest without any view of the cylinder.

In the present example embodiment, the various views 202, 204, and 206 along with their associated locations 222, 224, and 226, respectively, provide a rich source of information about object of interest 208 and the surrounding context that can be used to produce a multi-view digital media representation, such as a surround view. For instance, when analyzed together, the various views 202, 204, and 206 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 208 into content and the scenery 210 as the context. In particular examples, the content can then be used as part of a visual search query.

Figure 3:
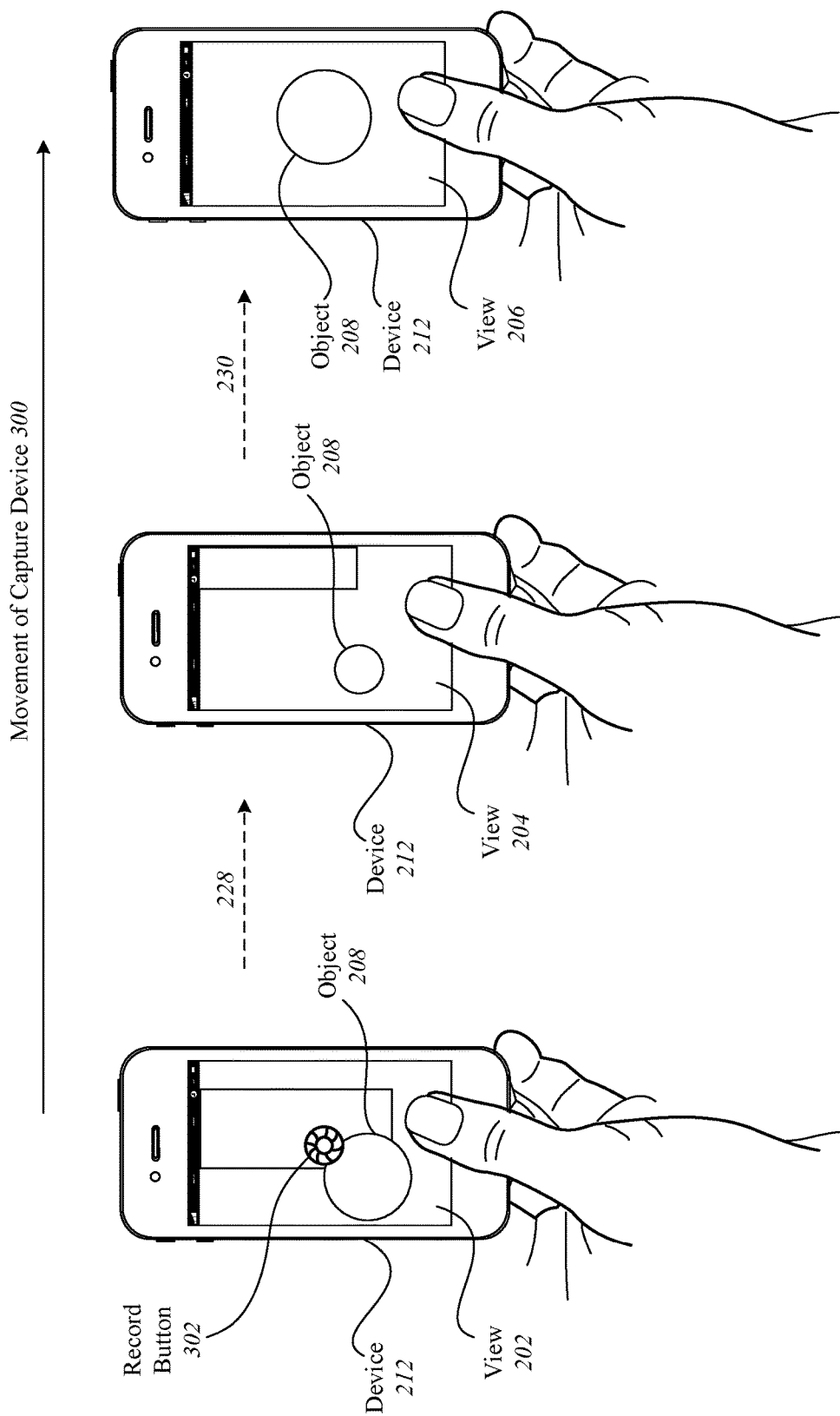
FIG. 3 illustrates an example of a device capturing views of an object of interest for a surround view.

With reference to FIG. 3, shown is an example of a device capturing views of an object of interest for a surround view. In particular, this device can be used during a live session or to create a stored surround view. During a live session, the views are captured by the device during the search session. In some examples, additional views can be added by moving the capture device during the search process. For a stored surround view, the views are captured before the search process begins.

During a capture session, multiple views of the object 208 are captured by the device 212 from different locations. In the present example, data is acquired when a user taps a record button 302 on capture device 212 to begin recording images of the object 208. The user moves 300 the capture device 212 from location 222 to location 224 along path 228 and from location 224 to location 226 along path 230. In some examples, prompts for the user to capture particular views can be provided during the session in order to improve the accuracy of the surround view. In particular, the system can prompt the user to move the device 212 in a particular direction or may prompt the user to provide additional information. Once the user has finished capturing images of the object for the surround view, the user may choose to stop recording by tapping the record button 302 again. In other examples, the user can tap and hold the record button during the session, and release to stop recording. In the present example, the recording captures a series of images that can be used to generate a surround view that can be used as a visual search query.

Figure 4:
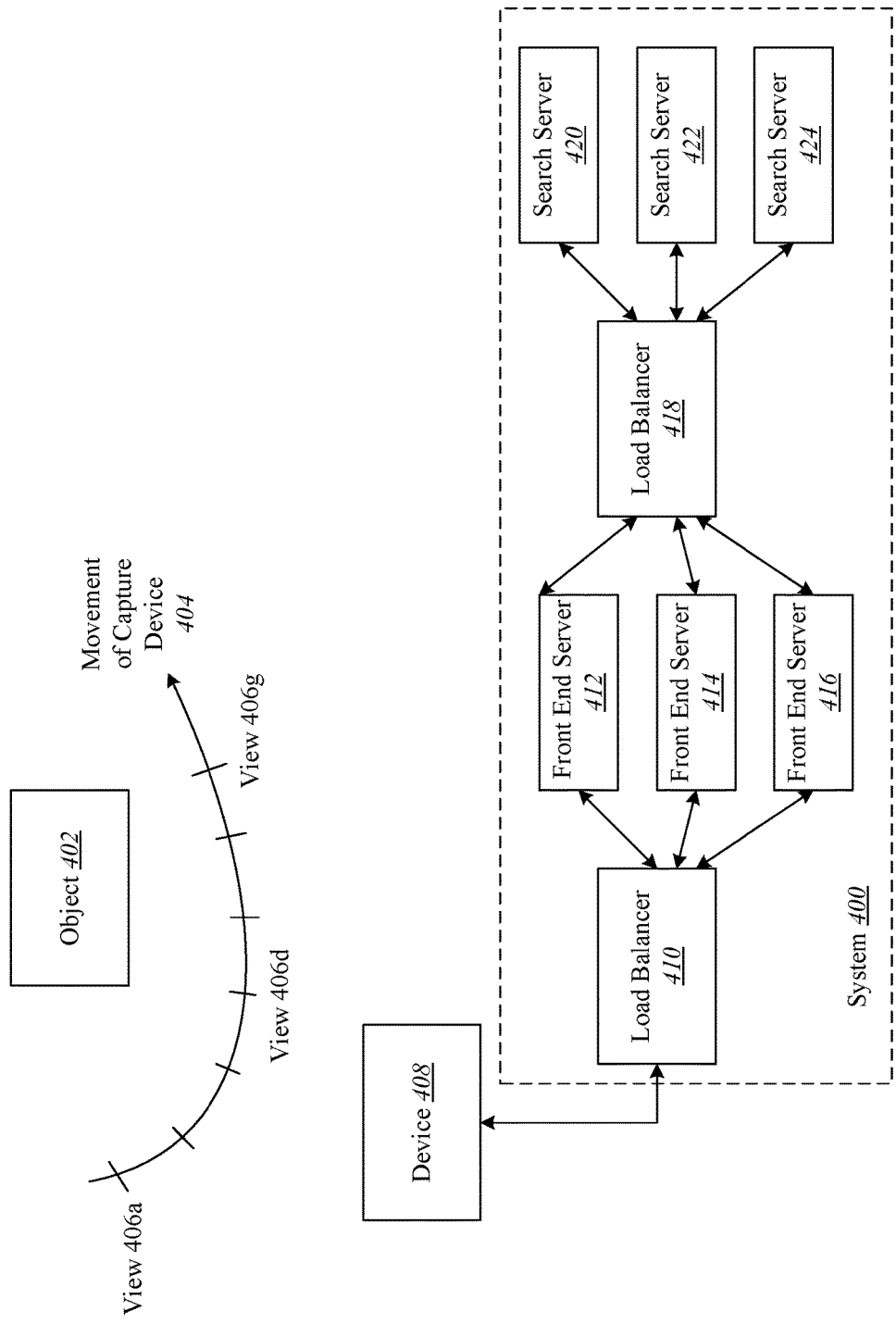
FIG. 4 illustrates one example of a system that can be used to perform a visual search using surround views.

With reference to FIG. 4, shown is one example of a system that can be used to perform a visual search using surround views. As depicted, a combination of client and server applications is used to implement a visual search mechanism that uses a surround view as a search query. In the present embodiment, the client is depicted as device 408, which can be a capture device such as a digital camera, smartphone, mobile device, etc. In some examples, the device 408 can be a computer or other electronic device that stores a surround view of an object to be searched. The server is depicted as system 400, which receives a surround view that includes images of the object to be searched.

In the present embodiment, system 400 generates search results based on the surround view by comparing a surround view received from device 408 to surround views and/or images stored by or accessible to system 400. As shown, system 400 includes load balancers 410 and 418, front end servers 412, 414, and 416, and search servers 420, 422, and 424. Depending on the particular implementation of the system 400, front end servers 412, 414, and 416 can be used for operations such as determining additional views and/or information that may be helpful in refining the search results, calculating correspondence measures and/or confidence values, and communicating with device 408. The search servers 420, 422, 424 can be used for operations such as those relating to searching for and retrieving search results. Although system 400 includes load balancers 410 and 418 to improve performance of the system and make the system scalable, these load balancers 410 and 418 are optional in some implementations.

According to various embodiments, device 408 captures images of object 402 to generate a surround view that can be used in a search query for the object. In particular, device 408 follows a path depicted as movement of capture device 404 while recording images of object 402 from views 406a to 406g. The views 406a to 406g are captured as images or frames, along with additional information such as location information, spatial information, and scale information corresponding to each of these images or frames. Although device 408 is depicted as being a capture device in the present example, it is also possible in other examples that device 408 is a computing device that has access to a stored surround view that includes views of the object to be searched.

In the present example, the session begins by initially sending a surround view from device 408 to system 400 as a visual search query. The surround view includes images (or frames) and other information associated with the images, such as data collected by sensors (e.g. IMU data, GPS location, audio etc.). The system 400 performs a search by comparing the surround view to a set of stored surround views associated with different items. In some embodiments, the surround view may also be compared to stored images or sets of images. In some cases, the system returns search results to the user with a unique identifier that allows the user to send more data along with the unique identifier, such that the additional data expands coverage of the surround view. If additional data is sent, system 400 uses the additional data to improve the search results by combining the additional data with the previously received surround view. The system then performs a search again with the improved surround view as a visual search query.

Figure 5:
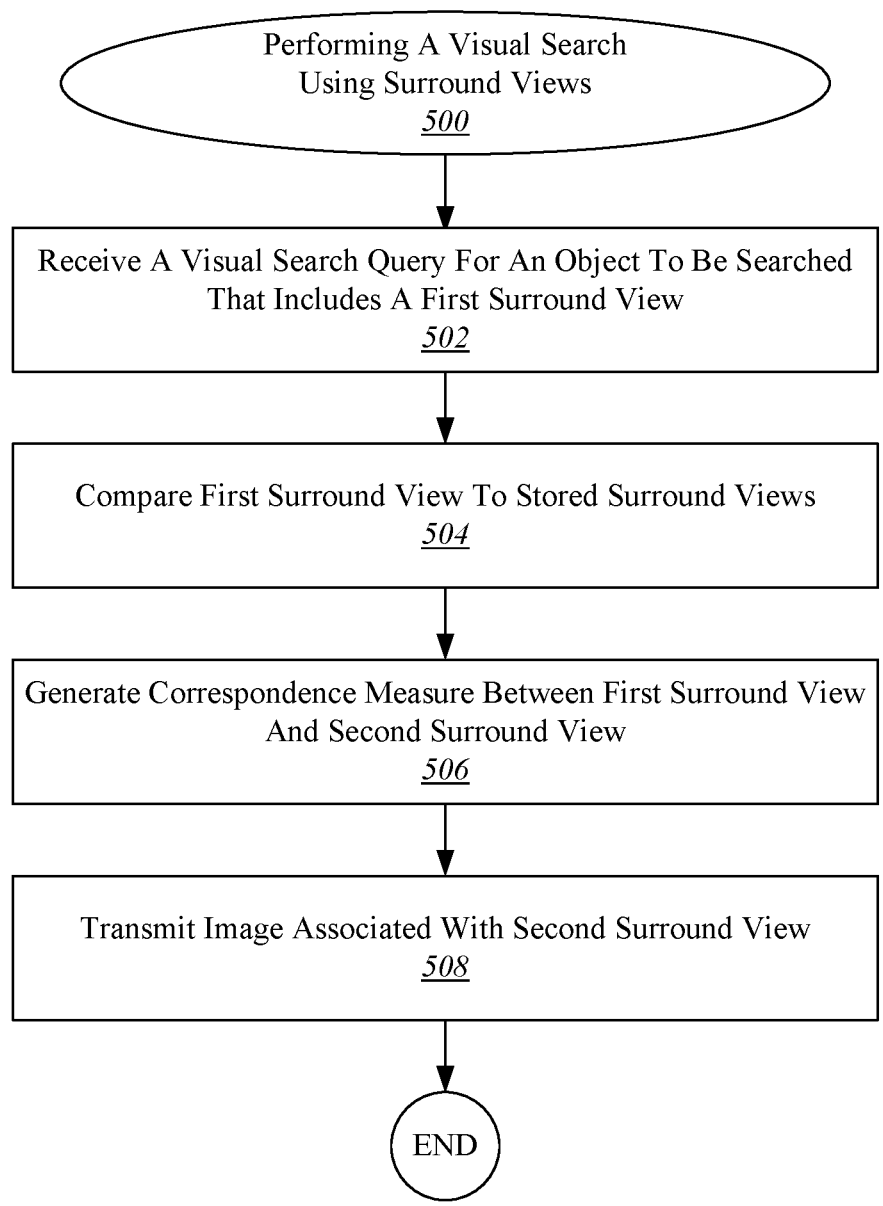
FIG. 5 illustrates an example of a process for performing a visual search using surround views.

With reference to FIG. 5, shown is an example of a process for performing a visual search using surround views. Using surround views or other multi-view interactive digital media representations in visual search provides advantages over using a single image or a stationary video recording. In particular, whereas a single image is only a grid of color pixels and a video is a time sequence of grids of color pixels, a multi-view interactive digital media representation is designed to include multiple viewpoints of the object of interest. Furthermore, in addition to pure visual information, which includes aspects such as color and texture, a multi-view interactive digital media representation also stores aspects such as spatial information about the visual data (such as 3D location information for the visual information, depth information, or visual flow between different viewpoints), geo-location, date and time of capture, and IMU data (such as compass, gravity vector, or orientation), scale, geometric information, and shape information. Accordingly, multi-view interactive digital media representations, such as surround views, provide significantly richer data for performing a visual search.

According to various embodiments, multi-view interactive digital media representations can be compact and searchable, such that they can be used effectively in visual search. These multi-view interactive digital media representations, such as surround views, can be generated by various methods of aggregating information from multiple viewpoints. Examples of such aggregation methods can include max/average pooling, bag of words, vector of locally aggregated descriptors (VLAD), and/or fisher vectors.

In particular embodiments, visual search using multi-view interactive digital media representations can be performed between multi-view interactive digital media representations (i.e. use one multi-view interactive digital media representation to search for other multi-view interactive digital media representations) or between multi-view interactive digital media representations and other types of digital media, such as images, text, videos, voice, or 3D models. For visual search using other types of digital media, the search can be done in either direction. For instance, a multi-view interactive digital media representation can be used to search for images or an image can be used to search for multi-view interactive digital media representations. Although the present example describes using a surround view to search through stored surround views, other types of multi-view interactive digital media representations or digital media representations can also be used in visual search as described in this disclosure.

In the present example, a process for performing a visual search using surround views 500 begins when the system receives a visual search query for an object to be searched at 502. The visual search query includes a first surround view of the object to be searched, where the first surround view includes spatial information, scale information, and different viewpoint images of the object. According to various embodiments, the spatial information can include depth information, visual flow between the different viewpoints, and/or three-dimensional location information. In some instances, the scale information can be estimated using accelerometer information obtained when capturing the first surround view. Additionally, in some examples, the scale information can be determined using inertial measurement unit (IMU) data obtained when capturing the first surround view. Furthermore, in some examples, the first surround view of the object may also include three-dimensional shape information.

Different types of visual search can be performed such as live search, selective search, parameterized search, and viewpoint aware search. Any of these types of searches can be performed within the scope of this disclosure. In particular, live search includes a process that occurs during a session in which the search can happen incrementally or at once. During an incremental search, a subset of the available viewpoints is first used to perform an initial search. This search is then refined using more and more viewpoints in an iterative process. For instance, live search can be performed in real-time while a surround view is being captured. Further descriptions of selective search, parameterized search, and viewpoint aware search are described below with regard to latter figures. These types of search may also be integrated into the present example, within the scope of this disclosure. Specifically, any of these types of search or any combination of these types of search can be used with the current example.

Next, at 504, the first surround view is compared to a plurality of stored surround views. In particular, spatial information and scale information of the first surround view is compared to spatial information and scale information of the stored surround views. In some examples, the first surround view of the object is compared to one or more stored surround views without generating a 3D model of the object. In other examples, a 3D model may be generated and used for comparing the surround views.

In the present example, the stored surround views include a second surround view. This second surround view is generated by aggregating spatial information, scale information, and different viewpoint images obtained when capturing the second surround view. In some instances, different viewpoint images obtained when capturing the second surround view can be aggregated using an algorithm such as pooling, bag of words, vector of locally aggregated descriptors (VLAD), and fisher vectors. In the present embodiment, this second surround view is a possible match for the first surround view based on the comparison of spatial and scale information between the two surround views.

According to various examples, a correspondence measure is generated at 506 that indicates the degree of similarity between the first surround view and the second surround view. For instance, the degree of similarity may include a percentage that represents the amount of correlation between the surround views. This correspondence measure can be used in different ways depending on the desired application. In particular, the correspondence measure can be calculated for multiple stored surround views and the ones with the highest degree of similarity can be selected as search results to be returned to the user. In some examples, each stored surround view that is compared to the first surround view can have a correspondence measure calculated for it. Furthermore, in some examples, the correspondence measure can be used to rank the search results by relevancy. In some examples, the correspondence measure can be displayed with search results as a response to the visual search query. However, in other examples, the correspondence measure may be used only by the system to determine matches and not displayed to the user with search results.

In the present example, once one or more matches are found, the search results are transmitted to the user at 508. In particular, if the second surround view is found to be a match, an image associated with the second surround view is transmitted in response to the visual search query. This image may include a thumbnail and/or link associated with the second surround view. In particular, the link may allow the user to view the second surround view to determine if this is an appropriate match. Furthermore, additional information may be included with the image in some instances, such as information about the item, source of the item, where to purchase the item, etc.

Figure 6:
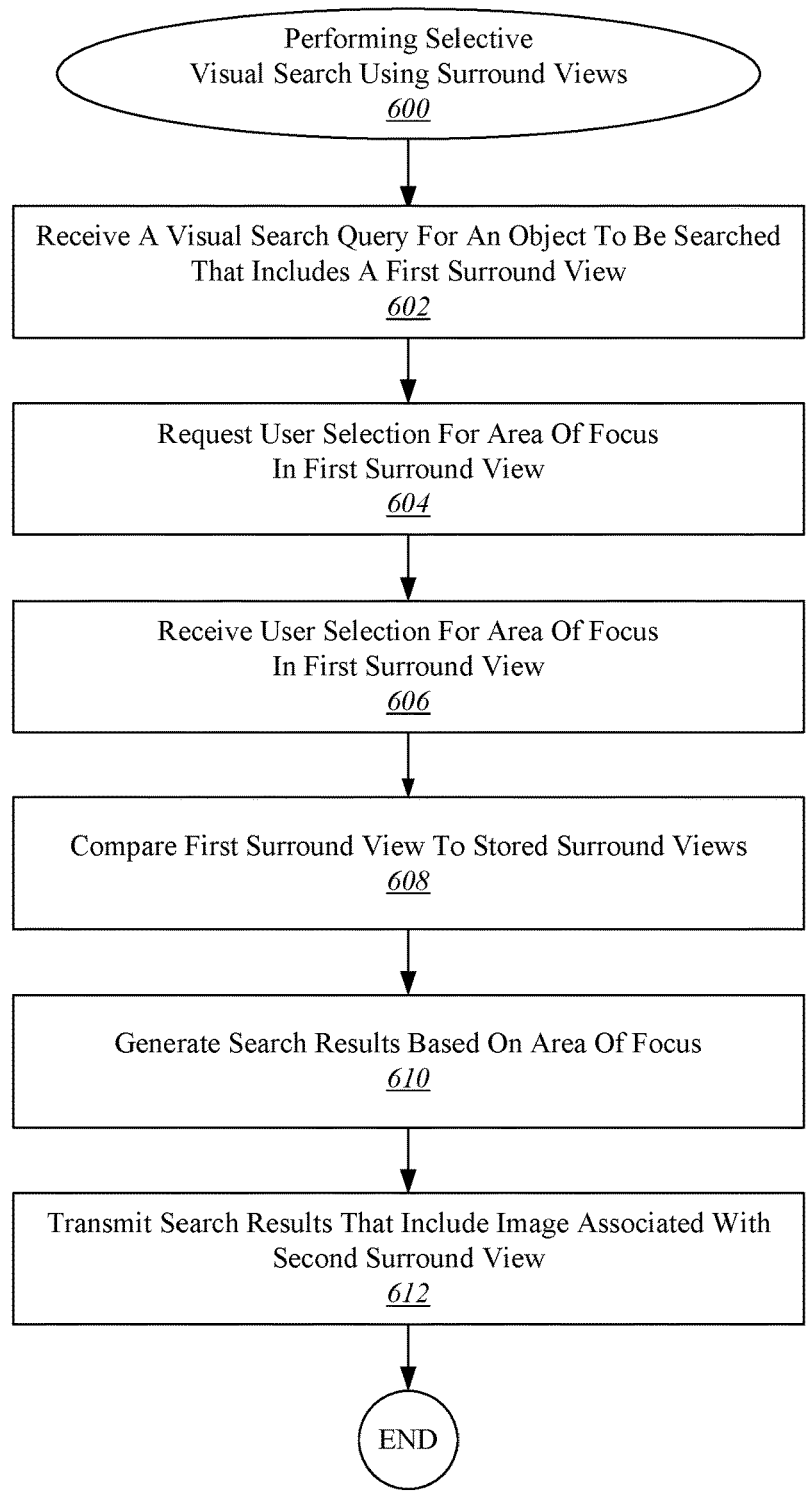
FIG. 6 illustrates an example of a process for performing a selective visual search using surround views.

With reference to FIG. 6, shown is an example of a process for performing a selective visual search using surround views. A visual search can be performed based on either a full multi-view interactive digital media representation or parts of it. A visual search based on particular parts of a multi-view interactive digital media representation, such as a surround view, is a selective visual search. A selective visual search can be implemented in various ways. For example, an option for the user to select one of multiple pre-selected objects or parts in a captured scene can be provided, as described below with regard to FIG. 7. The selectable objects can be chosen automatically or manually. In another example, the user is given an option to manually select a specific region/object/part of a captured scene. In particular, the user may draw a bounding box or circle a region of interest to select a specific portion of the scene.

In the present example, a process for performing selective visual search using surround views 600 begins when a visual search query for an object to be searched is received at 602. This visual search query includes a first surround view of the object to be searched that includes spatial information, scale information, and different viewpoint images of the object. According to various embodiments, the spatial information can include depth information, visual flow between the different viewpoints, and/or three-dimensional location information. In some instances, the scale information can be estimated using accelerometer information obtained when capturing the first surround view. Additionally, in some examples, the scale information can be determined using inertial measurement unit (IMU) data obtained when capturing the first surround view. Furthermore, in some examples, the first surround view of the object may also include three-dimensional shape information.

Once the visual search query is received, the system requests a user selection for an area of focus in the first surround view at 604. As described above, the user may select a predetermined object or area of a scene in the first surround view, or the user may select a region of the scene by drawing a bounding box or other shape around the region. This user selection for an area of focus in the first surround view is then received by the system at 606.

Next, the first surround view is compared to stored surround views at 608. More specifically, a selective visual search is performed by comparing the area of focus selected by the user in the first surround view to the stored surround views. In the present example, the stored surround views include a second surround view. This second surround view is generated by aggregating spatial information, scale information, and different viewpoint images obtained when capturing the second surround view. In some instances, different viewpoint images obtained when capturing the second surround view can be aggregated using an algorithm such as pooling, bag of words, vector of locally aggregated descriptors (VLAD), and fisher vectors. In the present embodiment, this second surround view is a possible match for the first surround view based on the comparison of spatial and scale information between the two surround views.

Based on a comparison of an area of focus of the first surround view to the stored surround views, search results are generated at 610. Once one or more matches are found, the search results are transmitted to the user at 612. In particular, if the second surround view is found to be a match, an image associated with the second surround view is transmitted in response to the visual search query. This image may include a thumbnail and/or link associated with the second surround view. In particular, the link may allow the user to view the second surround view to determine if this is an appropriate match. Furthermore, additional information may be included with the image in some instances, such as information about the item, source of the item, where to purchase the item, etc.

Figure 7:
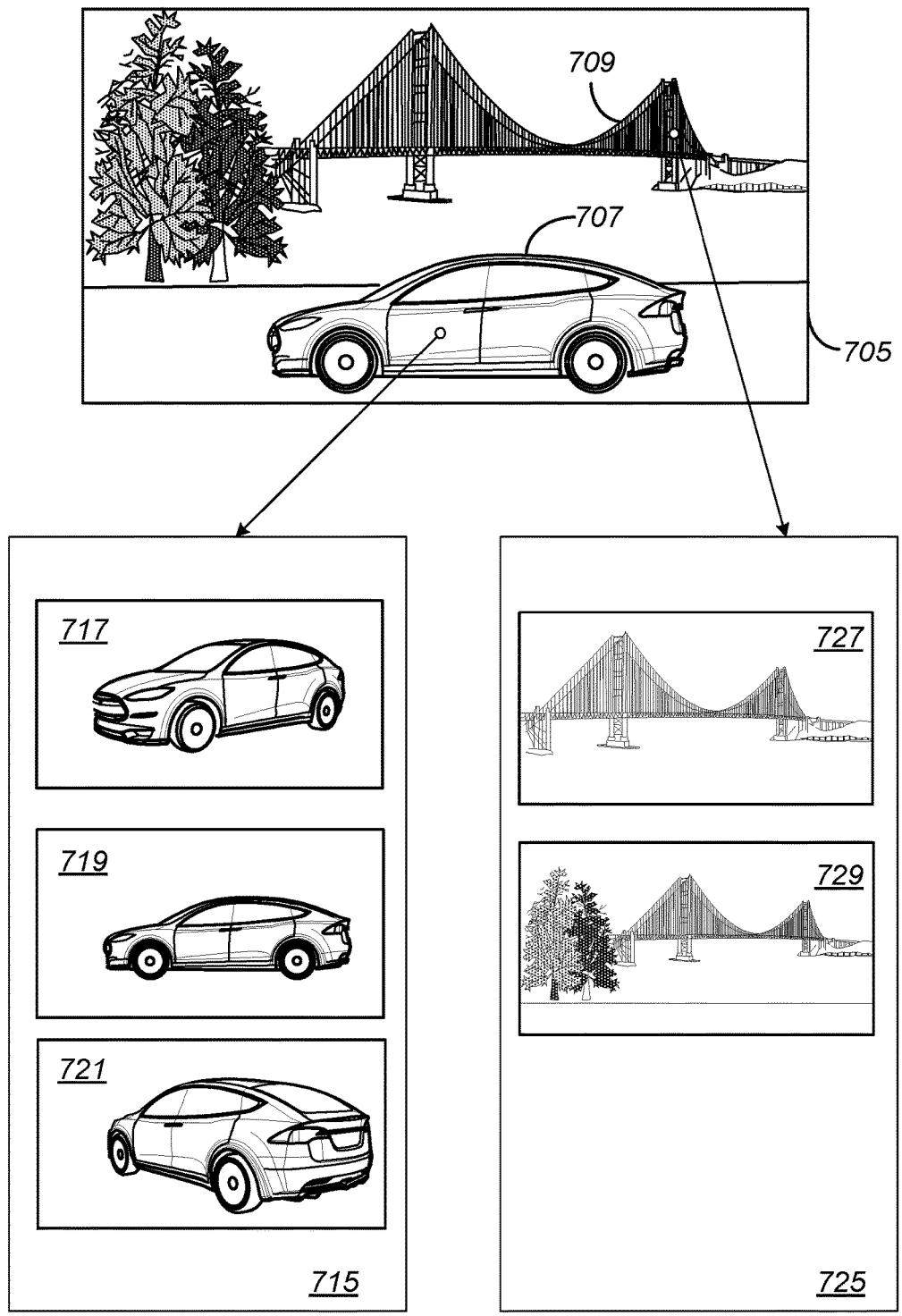
FIG. 7 illustrates an example of a scene from a surround view that is presented to a user as a prompt for the user to select an area of focus for a selective visual search.

With reference to FIG. 7, shown is an example of a scene from a surround view that is presented to a user as a prompt for the user to select an area of focus in the scene for a selective visual search. As depicted, scene 705 shows a particular viewpoint of a surround view. Two preselected objects of interest are presented as vehicle 707 and bridge 709. According to various embodiments, the user can select one of these objects of interest as the subject of a selective visual search. Search results 715 show thumbnail images of some of the possible search results 717, 719, and 721 for a search of the vehicle 707. Search results 725 show thumbnail images of some of the possible search results 727 and 729 of the bridge 709. In some examples, the user selects the object of interest by engaging a touch screen on a mobile device (such as by tapping the touch screen) or using a mouse on a personal computer. In addition, selections of specific areas of the scene can be made by designating a bounding box or other shape to indicate the area of focus. For instance, the user may circle a portion of the vehicle 707, such as the rims.

Figure 8:
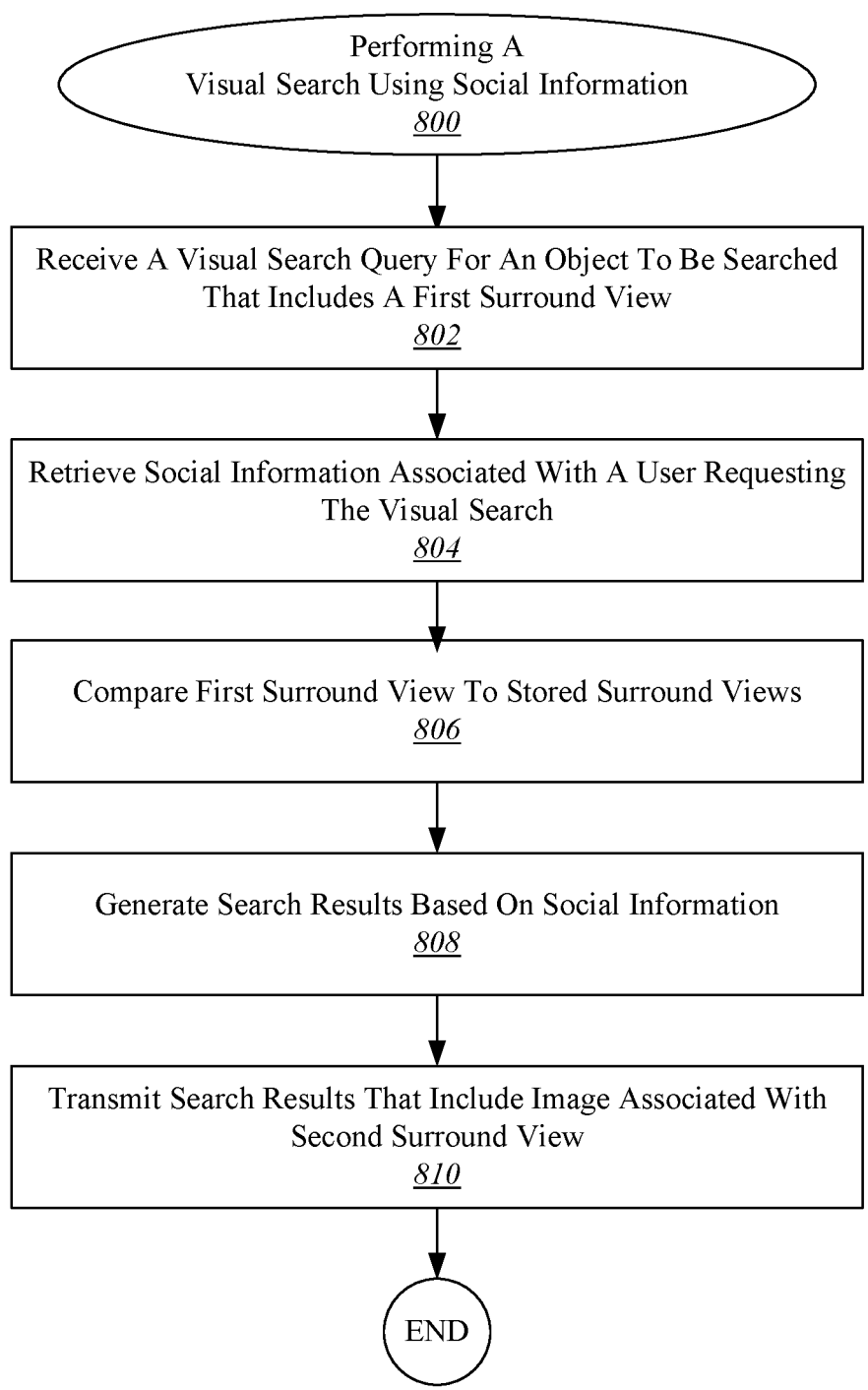
FIG. 8 illustrates an example of a process for performing a visual search using social information.

With reference to FIG. 8, shown is an example of a process for performing a visual search using social information. In particular, social information associated with a user requesting a visual search is considered when generating search results. By considering social information associated with the user when generating search results, the search results can be tailored to the specific user and the system can provide the user with more relevant and potentially higher quality data in the results.

According to various embodiments, search results are tailored based on social information such as what the user has viewed or interacted with in the past. This may include various websites, areas of interest, people, or any other entities with which the user may have interacted. In some examples, social information can include data about which parts of a multi-view interactive digital media representation that the user has focused on or paid more attention to. Furthermore, the system can also use additional information, such as the popularity of the content, the parts and/or viewpoint of the content that are visible or receive the most views, etc., to provide search results with potentially higher quality data that is more relevant to the user's interests.

In the present example, a process for performing a visual search using social information 800 begins when a visual search query for an object to be searched is received at 802. This visual search query includes a first surround view of the object to be searched that includes spatial information, scale information, and different viewpoint images of the object. According to various embodiments, the spatial information can include depth information, visual flow between the different viewpoints, and/or three-dimensional location information. In some instances, the scale information can be estimated using accelerometer information obtained when capturing the first surround view. Additionally, in some examples, the scale information can be determined using inertial measurement unit (IMU) data obtained when capturing the first surround view. Furthermore, in some examples, the first surround view of the object may also include three-dimensional shape information.

Once the visual search query is received, the system retrieves social information associated with the user requesting the visual search at 804. Next, the first surround view is compared to stored surround views at 806. In the present example, the stored surround views include a second surround view. This second surround view is generated by aggregating spatial information, scale information, and different viewpoint images obtained when capturing the second surround view. In some instances, different viewpoint images obtained when capturing the second surround view can be aggregated using an algorithm such as pooling, bag of words, vector of locally aggregated descriptors (VLAD), and fisher vectors. In the present embodiment, this second surround view is a possible match for the first surround view.

As the first surround view is compared to the stored surround views, potential matches can be filtered based on the social information associated with the user. Search results are then generated based on these filtered matches at 808. Once one or more filtered matches are found, the search results are transmitted to the user at 810. In particular, if the second surround view is found to be a match, an image associated with the second surround view is transmitted in response to the visual search query. This image may include a thumbnail and/or link associated with the second surround view. In particular, the link may allow the user to view the second surround view to determine if this is an appropriate match. Furthermore, additional information may be included with the image in some instances, such as information about the item, source of the item, where to purchase the item, etc.

Figure 9:
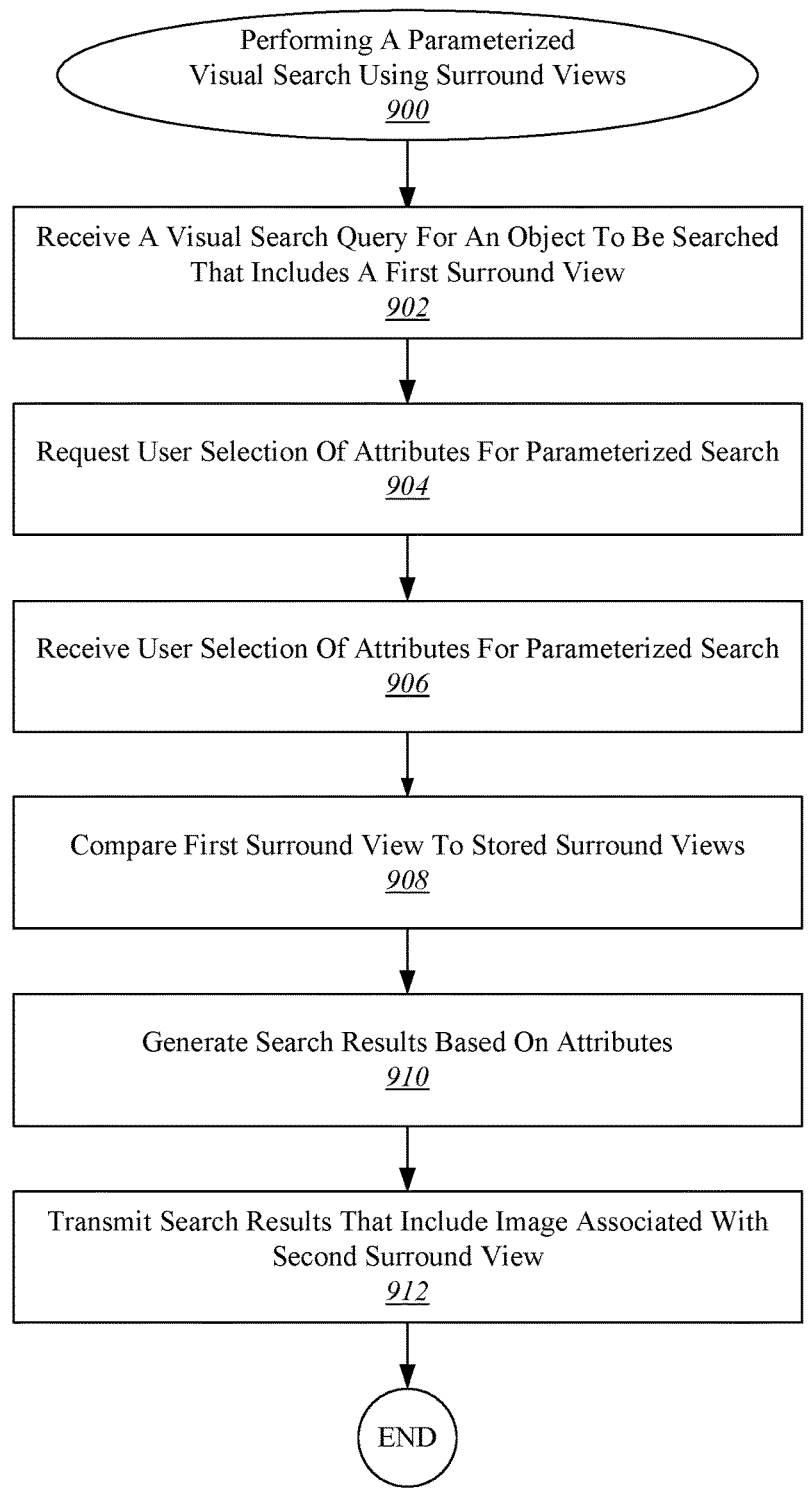
FIG. 9 illustrates an example of a process for performing a parameterized visual search using surround views.

With reference to FIG. 9, shown is an example of a process for performing a parameterized visual search using surround views. In particular, the visual search can be parameterized based on different attributes in order to steer the search in specific directions. Attributes may include aspects such as shape, scale, dimensions, color, texture, and/or content/object category, in various levels of detail. In addition, considering particular attributes allows a user to specify which aspects of a surround view are important to the user. Specifically, some parts of the object of interest may be important, whereas other parts of the object may not be important. For instance, if a surround view presented as a search query includes a car, the user may want to find matches in which the car is the same but the wheels' rims may vary. Accordingly, including certain attributes of the car may focus the search on certain aspects of the car. Similarly, specifying certain attributes that are not important may also be useful in some implementations. Special use-cases for parameterized search are social search vs. e-commerce search. Whereas social search usually strives for a more broad and exploratory search, e-commerce search aims for a more fine-grained search in which a user may want to find exactly the same content or very similar content. By specifying the user's preference for the type of information desired, the system can provide more useful and relevant search results.

In the present example, a process for performing a parameterized visual search 900 begins when a visual search query for an object to be searched is received at 902. This visual search query includes a first surround view of the object to be searched that includes spatial information, scale information, and different viewpoint images of the object. According to various embodiments, the spatial information can include depth information, visual flow between the different viewpoints, and/or three-dimensional location information. In some instances, the scale information can be estimated using accelerometer information obtained when capturing the first surround view. Additionally, in some examples, the scale information can be determined using inertial measurement unit (IMU) data obtained when capturing the first surround view. Furthermore, in some examples, the first surround view of the object may also include three-dimensional shape information.

Once the visual search query is received, the system sends a request for user selection of attributes to be used for the parameterized search at 904. Once the user's selection of attributes for the parameterized search are received at 906, attributes associated with the first surround view are compared to attributes associated with the stored surround views at 908. In the present example, the stored surround views include a second surround view. This second surround view is generated by aggregating spatial information, scale information, and different viewpoint images obtained when capturing the second surround view. In some instances, different viewpoint images obtained when capturing the second surround view can be aggregated using an algorithm such as pooling, bag of words, vector of locally aggregated descriptors (VLAD), and fisher vectors. In the present embodiment, this second surround view is a possible match for the first surround view based on the comparison of spatial and scale information between the attributes of the two surround views.

As attributes associated with the first surround view are compared to attributes associated with the stored surround views, search results are generated based on the attribute matches at 910. Once one or more matches are found, the search results are transmitted to the user at 912. In particular, if the second surround view is found to be a match, an image associated with the second surround view is transmitted in response to the visual search query. This image may include a thumbnail and/or link associated with the second surround view. In particular, the link may allow the user to view the second surround view to determine if this is an appropriate match. Furthermore, additional information may be included with the image in some instances, such as information about the item, source of the item, where to purchase the item, etc.

Figure 10:
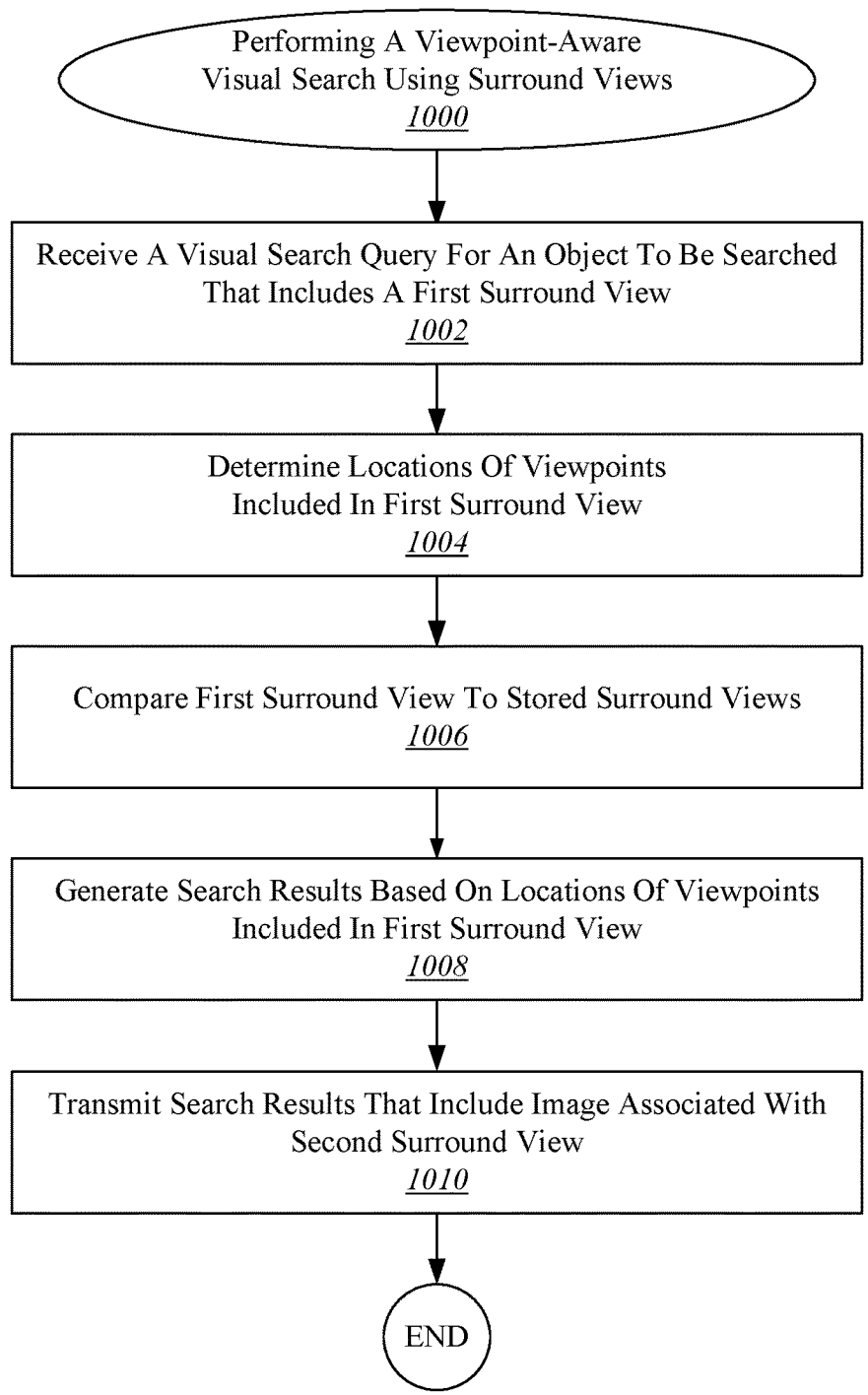
FIG. 10 illustrates an example of a process for performing a viewpoint-aware visual search using surround views.

With reference to FIG. 10, shown is an example of a process for performing a viewpoint-aware visual search using surround views. In particular, a viewpoint-aware visual search can be performed by taking into account the viewpoints from which the content of the surround view or other multi-view interactive digital media representation is visible. Specifically, location information for the viewpoints can be identified and used to determine the scope of the viewpoints represented in the surround view. In one example, search results may include matches that show the content from similar viewpoints. In another example, search results may include matches that show the content from different viewpoints than those shown in the search query surround view. These search results include the complementary viewpoint(s) in such a way as to complete the query representation by showing features of an object from a different viewpoint from the surround view presented as the search query. These complementary viewpoints can help the user differentiate the search results.

For instance, if a surround view of a women's dress is presented as a search query that includes viewpoints from the front of the dress, complementary search results would include viewpoints from the back of the dress. Although the results from the front of the dress would qualify as matches for the surround view presented in the search query, the user could more quickly parse the search results based on the viewpoints from the back of the dress to determine which matches are most relevant. In particular, some search results may include a zipper in the back view, a bow, or buttons. The user can then easily determine which of the search results is an appropriate match. An example of different surround views showing the same or a similar object from different viewpoints is shown and described below with regard to FIG. 11.

In the present example, a process for performing a viewpoint-aware visual search 1000 begins when a visual search query for an object to be searched is received at 1002. This visual search query includes a first surround view of the object to be searched that includes spatial information, scale information, and different viewpoint images of the object. According to various embodiments, the spatial information can include depth information, visual flow between the different viewpoints, and/or three-dimensional location information. In some instances, the scale information can be estimated using accelerometer information obtained when capturing the first surround view. Additionally, in some examples, the scale information can be determined using inertial measurement unit (IMU) data obtained when capturing the first surround view. Furthermore, in some examples, the first surround view of the object may also include three-dimensional shape information.

Once the visual search query is received, the system determines the locations of the viewpoints included in the first surround view at 904. Once the locations of these viewpoints are determined, the first surround view is compared to stored surround views at 1006. In particular, similar viewpoints in the stored surround views can be compared with the viewpoints provided in the first surround view. In the present example, the stored surround views include a second surround view. This second surround view is generated by aggregating spatial information, scale information, and different viewpoint images obtained when capturing the second surround view. In some instances, different viewpoint images obtained when capturing the second surround view can be aggregated using an algorithm such as pooling, bag of words, vector of locally aggregated descriptors (VLAD), and fisher vectors. In the present embodiment, this second surround view is a possible match for the first surround view.

As the first surround view is compared to the stored surround views, search results are generated based on the viewpoints included in the first surround view at 1008. Once one or more matches are found, the search results are transmitted to the user at 1010. In particular, if the second surround view is found to be a match, an image associated with the second surround view is transmitted in response to the visual search query. This image may include a thumbnail and/or link associated with the second surround view. In particular, the link may allow the user to view the second surround view to determine if this is an appropriate match. In some examples, complementary viewpoints may be included in the search result thumbnails to allow the user to quickly find matches based on the views not shown in the first surround view. Furthermore, additional information may be included with the image in some instances, such as information about the item, source of the item, where to purchase the item, etc.

Figure 11:
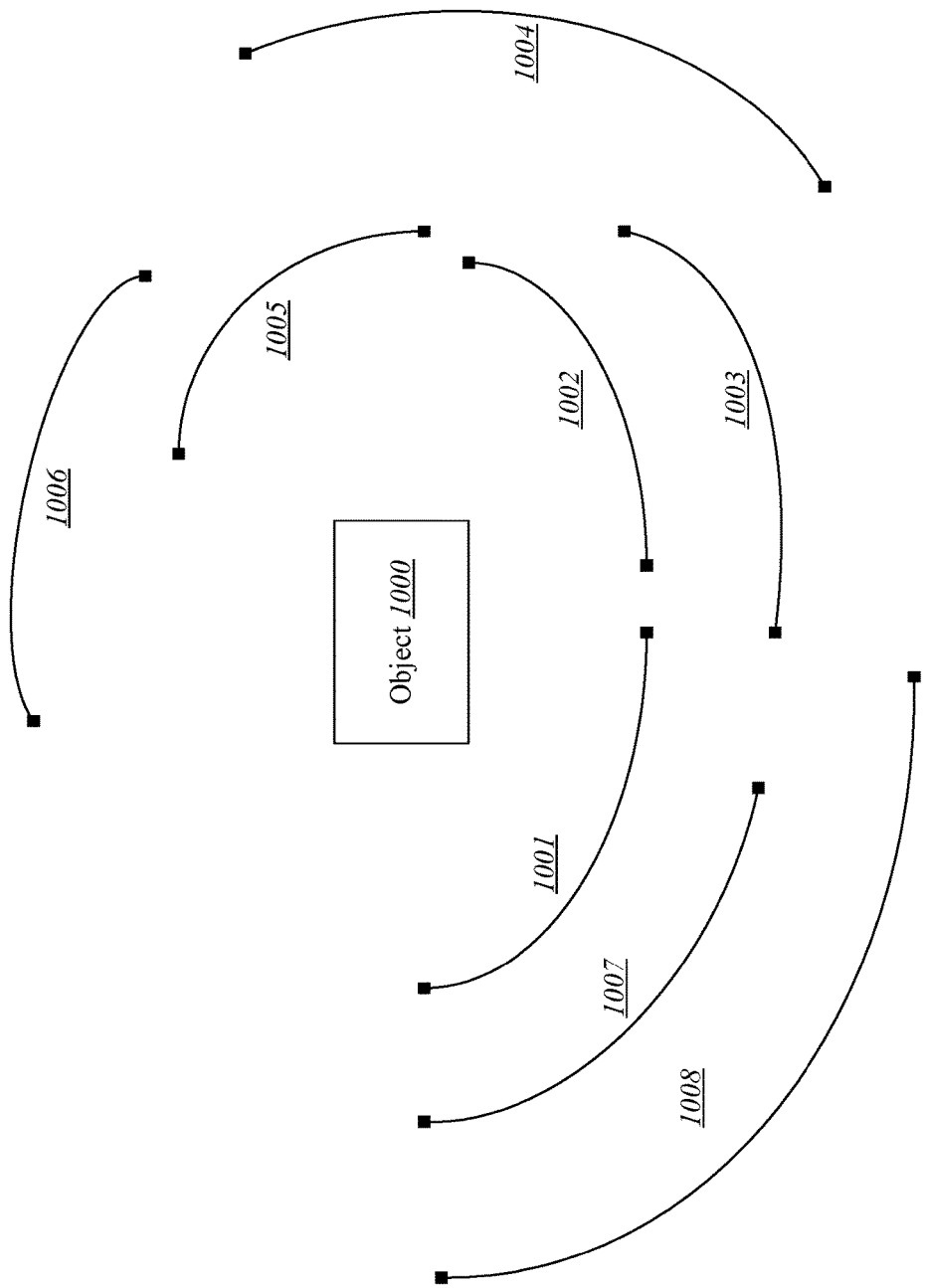
FIG. 11 is a diagrammatic representation showing an example of different recordings of the same or a similar object from different viewpoints.

With reference to FIG. 11, shown is a diagrammatic representation showing an example of different recordings of the same or a similar object from different viewpoints. As shown, recordings 1001, 1002, 1003, 1004, 1005, 1006, 1007, and 1008 capture images of object 1000 from different viewpoints. In a viewpoint-aware search, the viewpoints presented in search results for a surround view search query can be selected based on the desires of the user. For instance, if the user requests search results showing content from similar viewpoints, a query that includes recording 1001 would lead to search results 1007 and 1008. However, if the user requests search results for different viewpoints, a query that includes recording 1001 would lead to 1002, 1003, 1004, 1005, and 1006. In some cases, the search results can also be ranked based on the viewpoints they cover. Specifically, one possible ranking method would show results that cover the object from as many viewpoints as possible first. Accordingly, the results for a query that includes recording 1001 would lead to search results in the following order: 1002, 1005, 1006, 1008, 1003, 1004, and 1007, based on the additional viewpoints that these surround views add.

Figure 12:
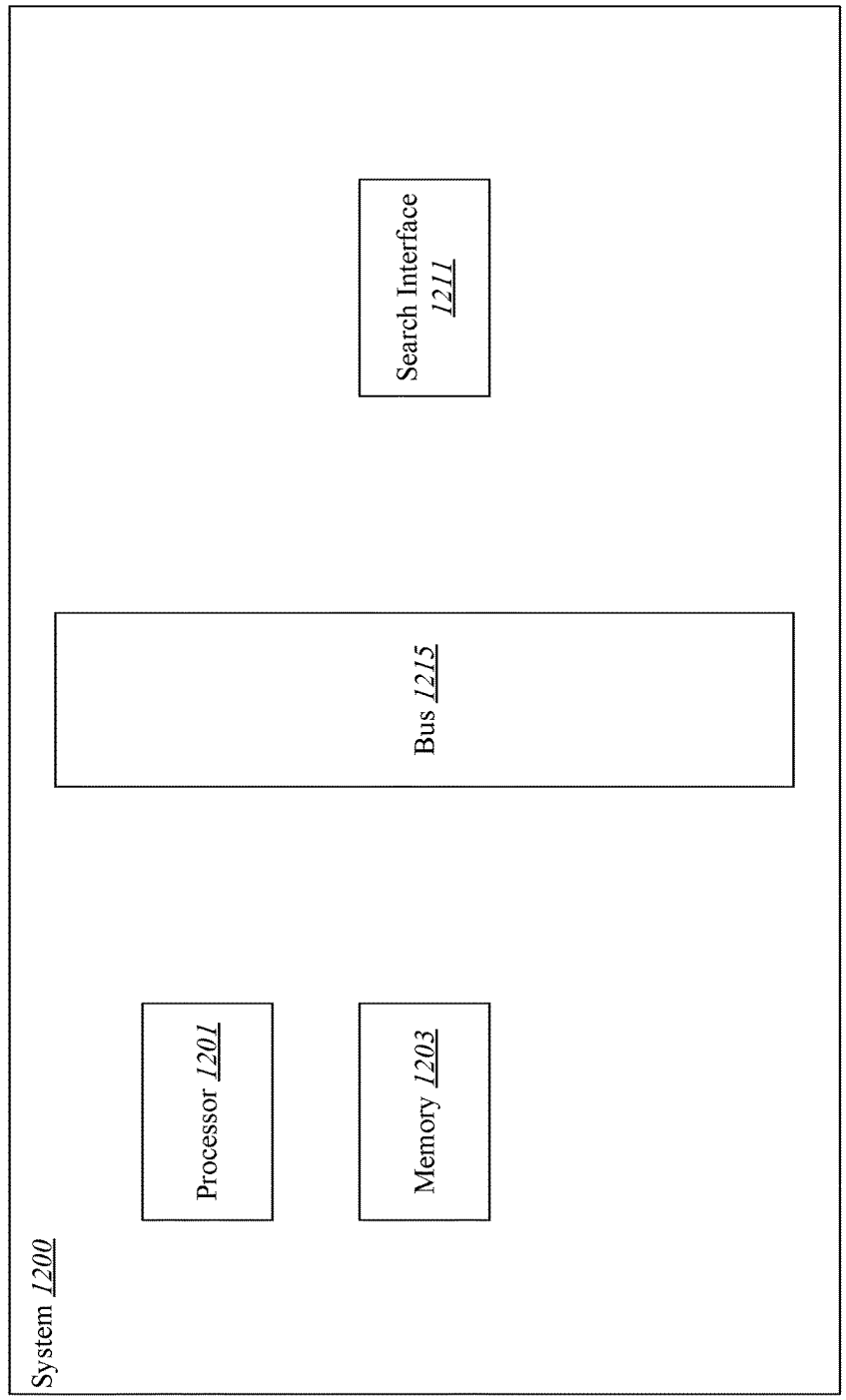
FIG. 12 illustrates a particular example of a computer system that can be used with various embodiments of the present invention.

With reference to FIG. 12, shown is a particular example of a computer system that can be used to implement particular examples of the present invention. For instance, the computer system 1200 can be used to perform a visual search using multi-view digital media representations, such as a surround views, according to various embodiments described above. In particular example embodiments, a system 1200 suitable for implementing particular embodiments of the present invention includes a processor 1201, a memory 1203, search interface 1211, and a bus 1215 (e.g., a PCI bus). The search interface 1211 may include separate input and output interfaces, or may be a unified interface supporting both operations. When acting under the control of appropriate software or firmware, the processor 1201 is responsible for such tasks such as optimization. Various specially configured devices can also be used in place of a processor 1201 or in addition to processor 1201. The complete implementation can also be done in custom hardware. The search interface 1211 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1200 uses memory 1203 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Various embodiments have been described in the present disclosure related to mechanisms and processes implementing visual search using surround views or other multi-view interactive digital media. Visual search using surround views in this manner provide numerous benefits and advantages over traditional image searching mechanisms and processes. In particular, one advantage is that surround views highlight the object of interest because a user captures a surround view by keeping the object of interest in the field of view while capturing views of the object from different angles. Another advantage is that surround views provide a separation of foreground and background, which provides information that is not available in single image visual search approaches. In particular, surround views include multiple viewpoints that allow the scene to be divided into layers of different depths and objects to be separated from each other. A further advantage is that surround views provide information about the scale of an object. Specifically, indicators such as IMU data, including acceleration, step counts, etc., can be used to estimate the scale of the object of interest. In contrast, traditional image-based visual search does not include IMU data, so the scale of an object cannot be estimated in traditional image-based search in this way.

Another advantage of using surround views in visual search is that surround views provide more context about the object of interest. In particular, although a surround view highlights the object of interest by featuring multiple viewpoints, a surround view also includes more information about the context or background available. This additional information about the context or background can be used by the system to further find and refine search results to be more relevant. For instance, a search of a particular jacket that is shown in a cold, snowy environment may yield search results for colder weather items than if the jacket is shown in a sunny, moderate environment.

Yet another advantage of using surround views in visual search is that surround views provide more information about the shape of an object of interest. Accordingly, a visual search can be used to find items with a similar shape but a different texture. For instance, a parameterized visual search using surround views can be used to focus the search on matches with the same shape, regardless of texture or other attributes of the object. In contrast, traditional image-based search does not allow for this type of specialized search because the single images used do not include 3D shape information.

As described in the present disclosure, using surround views provides more capabilities for visual search over traditional image-based search. For instance, the search can be focused on a particular object, attribute(s) of the object, portion of the object, social information history associated with the user, and/or viewpoint-aware aspects of the object. Accordingly, using surround views in visual search allows a user to obtain more relevant search results using these different search mechanisms.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

What is claimed is:

1. A method comprising;
receiving a visual search query, the visual search query including a first multi-view digital media representation of an object to be searched; wherein the first multi-view digital media representation of the object includes spatial information, scale information, and a plurality of different viewpoint images of the object, and wherein the first multi-view digital media representation of the object is capable of being displayed as a three-dimensional model on a display device;
comparing the first multi-view digital media representation to a plurality of stored multi-view digital media representations by comparing spatial information and scale information of the first multi-view digital media representation to spatial information and scale information of the stored multi-view digital media representations, wherein the stored multi-view digital media representations include a second multi-view digital media representation generated by aggregating spatial information, scale information, and a plurality of different viewpoint images obtained when capturing the second multi-view digital media representation;
generating a correspondence measure indicating the degree of similarity between the first multi-view digital media representation and the second multi-view digital media representation; and
transmitting an image associated with second multi-view digital media representation in response to the visual search query.

2. The method of claim 1, wherein the spatial information comprises depth information.

3. The method of claim 1, wherein the spatial information comprises visual flow between the different viewpoints.

4. The method of claim 1, wherein the spatial information comprises three-dimensional location information.

5. The method of claim 1, wherein scale information is estimated using accelerometer information obtained when capturing the first multi-view digital media representation.

6. The method of claim 1, wherein scale information is determined using inertial measurement unit (IMU) data obtained when capturing the first multi-view digital media representation.

7. The method of claim 1, wherein the first multi-view digital media representation of the object further comprises three-dimensional shape information.

8. The method of claim 1, wherein the first multi-view digital media representation of the object is compared to one or more stored multi-view digital media representations without generating a 3D model of the object.

9. The method of claim 1, wherein the plurality of different viewpoint images obtained when capturing the second multi-view digital media representation are aggregated using an algorithm selected from the group consisting of pooling, bag of words, vector of locally aggregated descriptors (VLAD), and fisher vectors.

10. The method of claim 1, wherein comparing the first multi-view digital media representation to a plurality of stored multi-view digital media representations further comprises performing selective visual search by comparing an area of focus in the first multi-view digital media representation to the plurality of stored multi-view digital media representations, the area of focus selected by a user submitting the visual search.

11. The method of claim 1, wherein comparing the first multi-view digital media representation to a plurality of stored multi-view digital media representations further comprises performing a parameterized visual search by comparing attributes associated with the first multi-view digital media representation to attributes associated with the plurality of stored multi-view digital media representations, wherein the attributes are specified by a user submitting the visual search.

12. The method of claim 11, wherein the attributes include parameter information that specify dimensions, color, texture, content/object category in various levels of detail.

13. The method of claim 1, wherein comparing the first multi-view digital media representation to a plurality of stored multi-view digital media representations further comprises performing a viewpoint-aware visual search by comparing viewpoints associated with the first multi-view digital media representation to viewpoints associated with the plurality of stored multi-view digital media representations.

14. The method of claim 1, wherein comparing the first multi-view digital media representation to a plurality of stored multi-view digital media representations further comprises filtering matches based on social information associated with a user submitting the visual search.

15. A system comprising:
an interface that receives a visual search query, the visual search query including a first multi-view digital media representation of an object to be searched, wherein the first multi-view digital media representation of the object includes spatial information, scale information, and a plurality of different viewpoint images of the object, wherein the first multi-view digital media representation of the object is capable of being displayed as a three-dimensional model on a display device, and wherein the interface further transmits an image associated with a search result in response to the visual search query;
a search server configured to compare the first multi-view digital media representation to a plurality of stored multi-view digital media representation by comparing spatial information and scale information of the first multi-view digital media representation to spatial information and scale information of the stored multi-view digital media representation, wherein the stored multi-view digital media representation include a second multi-view digital media representation generated by aggregating spatial information, scale information, and a plurality of different viewpoint images obtained when capturing the second multi-view digital media representation; and
a front end server configured to generate a correspondence measure indicating the degree of similarity between the first multi-view digital media representation and the second multi-view digital media representation.

16. The system of claim 15, wherein the search server is further configured to perform selective visual search by comparing an area of focus in the first multi-view digital media representation to the plurality of stored multi-view digital media representation, the area of focus selected by a user submitting the visual search; wherein the search server is further configured to perform a parameterized visual search by comparing attributes associated with the first multi-view digital media representation to attributes associated with the plurality of stored multi-view digital media representations, wherein the attributes are specified by the user submitting the visual search; wherein the search server is further configured to perform a viewpoint-aware visual search by comparing viewpoints associated with the first multi-view digital media representation to viewpoints associated with the plurality of stored multi-view digital media representations; and
    wherein the search server is further configured to filter matches based on social information associated with the user submitting the visual search.

17. A computer readable medium comprising:
    computer code that receives a visual search query, the visual search query including a multi-view digital media representation of an object to be searched, wherein the multi-view digital media representation of the object includes spatial information, scale information, and a plurality of different viewpoint images of the object, and wherein the multi-view digital media representation of the object is capable of being displayed as a three-dimensional model on a display device;
    computer code that compares the first multi-view digital media representation to a plurality of stored multi-view digital media representations by comparing spatial information and scale information of the first multi-view digital media representation to spatial information and scale information of the stored multi-view digital media representations, wherein the stored multi-view digital media representation include a second multi-view digital media representation generated by aggregating spatial information, scale information, and a plurality of different viewpoint images obtained when capturing the second multi-view digital media representation;
    computer code that generates a correspondence measure indicating the degree of similarity between the first multi-view digital media representation and the second multi-view digital media representation; and
    computer code that transmits an image associated with second multi-view digital media representation in response to the visual search query.

18. The computer readable medium of claim 17, further comprising:
    computer code that performs selective visual search by comparing an area of focus in the first multi-view digital media representation to the plurality of stored multi-view digital media representations, the area of focus selected by a user submitting the visual search; and
    computer code that performs a parameterized visual search by comparing attributes associated with the first s multi-view digital media representations to attributes associated with the plurality of stored multi-view digital media representations, wherein the attributes are specified by the user submitting the visual search.

19. The computer readable medium of claim 17, further comprising:
    computer code that performs a viewpoint-aware visual search by comparing viewpoints associated with the first multi-view digital media representation to viewpoints associated with the plurality of stored multi-view digital media representations.

20. The computer readable medium of claim 17, further comprising:
    computer code that filters matches based on social information associated with a user submitting the visual search.

* * * * *